United States Patent [19]
Ogawa et al.

[11] Patent Number: 5,341,210
[45] Date of Patent: Aug. 23, 1994

[54] DIGITAL RAMP PHASE TYPE OPTICAL INTERFERENCE GYRO

[75] Inventors: Kenji Ogawa; Osamu Itoyama; Motohiro Ishigami; Kenichi Okada, all of Tokyo, Japan

[73] Assignee: Japan Aviation Electronics Industry Limited, Tokyo, Japan

[21] Appl. No.: 92,491

[22] Filed: Jul. 16, 1993

[30] Foreign Application Priority Data

Jul. 22, 1992 [JP] Japan .................................. 4-195259

[51] Int. Cl.⁵ ............................................. G01C 19/64
[52] U.S. Cl. ............................................. 356/350
[58] Field of Search ..................................... 356/350

[56] References Cited
FOREIGN PATENT DOCUMENTS 0388929 9/1990 European Pat. Off. .
0427110 5/1991 European Pat. Off. .
0431474 6/1991 European Pat. Off. .

*Primary Examiner*—Vincent P. McGraw
*Attorney, Agent, or Firm*—Pollock, Vande Sande & Priddy

[57] ABSTRACT

In a digital ramp phase type gyro in which a ramp signal RAM is produced by repeatedly accumulating step values sequentially generated corresponding to an input angular rate until the accumulated value exceeds a threshold value THR or −THR and the ramp signal RAM is used to modulate the phases of clockwise and counterclockwise light beams to cancel the phase difference therebetween, a comparing part 38 compares the threshold values THR and −THR and the ramp signal RAM and, when the ramp signal RAM exceeds either one of the threshold values THR and −THR, outputs the threshold value THR or −THR and a subtractor 41 subtracts the output threshold value from the accumulated value at that time, thereby causing a flyback of the ramp signal RAM. The output from a synchronous detector 23 at this time is latched as an error signal in a latch circuit 31 and the error signal is integrated by an integrating filter 32 to generate a correcting signal. The correcting signal is added to a reference value Er in a circuit 37 to produce corrected threshold values THR and −THR and the phase difference between the clockwise and counterclockwise light beams immediately prior to the flyback is always held to be $2n\pi$ rad.

4 Claims, 5 Drawing Sheets

DIGITAL RAMP PHASE TYPE OPTICAL INTERFERENCE GYRO

BACKGROUND OF THE INVENTION

The present invention relates generally to a digital ramp phase type optical interference gyro of the type wherein two beams of light are caused to propagate through a looped optical path clockwise and counterclockwise and an input angular rate or velocity applied to the looped optical path around its axis is detected from the step size or frequency of a ramp signal of a step phase which cancels the phase difference between the both light beams which is caused in accordance with the applied input angular rate or velocity. More particularly, the invention relates to a part which controls the ramp signal so that the step phase is an integral multiple of $2\pi$ immediately prior to its flyback.

FIG. 1 shows a conventional optical interference gyro of this kind. Light emitted from a light source 11 is provided via an optical coupler or beam splitter 12 and a polarizer 13 to an optical coupler 14, from which two light beams are provided as clockwise and counterclockwise light beams to a looped optical path 15. The looped optical path 15 is usually formed by an optical fiber coil. Inserted between both ends of the looped optical path 15 and the optical coupler 14 are phase modulators 16 and 17. While the optical coupler 14 and the phase modulators 16 and 17 are shown to be formed as a single optical IC, they may also be provided individually as an optical coupler and optical phase modulators.

A bias signal generator 18 generates a square-wave bias modulation signal of a 50% duty, which is applied to the phase modulator 16 to drive it, modulating the phases of the clockwise and counterclockwise light beams (hereinafter referred to as CW and CCW light beams) which pass through the phase modulator 16. The cycle or period of the bias modulation signal is twice as long as the time $\tau$ for the propagation of light through the looped optical path 15 and each light beam is phase shifted alternately $\pi/4$ rad on the positive side and $\pi/4$ rad on the negative side at time intervals of $\tau$. The clockwise and counterclockwise light beams having propagated through the looped optical path 15 interfere with each other in the optical coupler 14. The resulting interference light is provided via the polarizer 13 and the optical coupler 12 to a photodetector 19, wherein it is converted into an electric signal corresponding to the light intensity.

Supplied with a clock signal CK1 of a $2\tau$ period from a clock generator 21, the bias signal generator 18 produces the above-mentioned bias modulation signal. A clock signal CK2 of a period $\tau$ is applied from the clock generator 21 to an A-D converter 22 to control it to convert the output from the photodetector 19 into a digital signal in synchronization with biasing by the bias modulation signal. The digital signal is applied to a synchronous detector 23, wherein it is synchronously detected by the clock signal CK1 of a $2\tau$ period from the clock generator 21. The synchronously detected output is fed to a step value generator 24, by which a step value corresponding to the height of one step of a stepped ramp signal is produced. The step value thus generated is provided to an adder 25, wherein it is added to the output from a latch circuit 26. The added output is then latched in the latch circuit 26 by the clock signal CK2 of a period $\tau$ from the clock generator 21 in synchronization with the bias modulation signal. The adder 25 and the latch circuit 26 constitute an accumulating part 27.

The accumulated output from the accumulating part 27 is converted by a D-A converter 28 into an analog signal, which is applied, as a feedback modulation signal, to the phase modulator 17 via a variable gain amplifier 29. The feedback modulation signal acts to cancel the phase difference between the CW and CCW light beams which is caused by the angular rate applied to the looped optical path 15 around its axis. A-bias modulation signal $V_B$, such as shown in FIG. 2, Row A, is produced by the bias signal generator 18, and in the optical coupler 14, when the input angular rate is zero, the phase of the CW light beam alternates between $+\pi/4$ rad and $-\pi/4$ rad at time intervals of $\tau$ as indicated by the solid line in FIG. 2, now B, whereas the phase of the CCW light beam alternates between $+\pi/4$ rad and $-\pi/4$ rad at time intervals of r as indicated by the broken line in FIG. 2, Row B. As a result, the phase difference between the both light beams alternates between $+\pi/2$ rad and $-\pi/2$ rad at time intervals of $\tau$.

When angular rate is applied, the step value generator 24 yields a step value which has a polarity corresponding to the direction of the input angular rate and corresponds to the phase difference between the CW and CCW light beams corresponding to the magnitude of the input angular rate. Such a step value is accumulated every period $\tau$, and consequently, in the optical coupler 14 the phase of the CW light beam varies in the form of such a stepped ramp waveform as indicated by the full line in FIG. 2, Row C, whereas the phase of the CCW light beams varies as a stepped ramp waveform delayed behind the CW light beam by $\tau$ as indicated by the broken line. Hence, the polarity and magnitude of the phase difference between the CW and CCW light beams vary with the input angular rate as shown in FIG. 2, Row D.

The gain of the variable gain amplifier 29 is initiated such that in the case where the phase difference $\Delta\phi$ between the CW and CCW light beams caused by the input angular rate could have been cancelled or offset by the feedback modulation signal, when the adder 25 overflows, the above-mentioned phase difference becomes an integral multiple of $2\pi$ rad and the output from the synchronous detector 23 remains zero as indicated by the solid line in FIG. 2, Row E.

The direction and magnitude of the input angular rate can be detected from the polarity and magnitude of the output step value of the step value generator 24 or the polarity and repetition frequency of the output stepped ramp waveform from the accumulating part 27.

There are cases where when the adder 25 is about to overflow, that is, when the stepped ramp waveform is on the verge of flyback, the phase difference $\Delta\phi$ between the CW and CCW light beams shifts from an integral multiple of $2\pi$ rad due to an ambient temperature change or ageing and the output from the synchronous detector 23 does not become zero as indicated by the broken line in FIG. 2, Row E, for instance—this is equivalent to a state in which the feedback modulation signal is not in equilibrium with the input angular rate, and hence measurement errors are induced.

To avoid this, it is a general practice in the prior art to adopt a circuit arrangement in which the output from the synchronous detector 23 at the time of an overflow of the adder 25 is taken out by a latch circuit 31, its output is integrated by an integrating filter 32 to obtain a correcting signal, the correcting signal thus obtained is subtracted by a subtractor 34 with respect to a reference value Vr from a reference value generator 33, the added output is converted by a D-A converter 35 into an analog signal, and the analog signal is used to control the gain of the variable gain amplifier 29. In the initial state the output from the integrating filter 32 is zero and the gain of the variable gain amplifier 29, which is based on the reference value Vr, is preadjusted so that the output from the synchronous detector 23, shown in FIG. 2, Row E, is zero. For example, in the case where the output of the synchronous detector 23 depicted in FIG. 2, Row R is shifted from zero owing to a decrease in the sensitivity of the phase modulator 17, the gain of the variable gain amplifier 29 is raised to compensate for the decrease in the sensitivity of the phase modulator 17.

As described above, according to the conventional optical interference gyro, when the phase difference between the CW and CCW light beams-shift from an integral multiple of $2\pi$ rad immediately prior to flyback of the stepped ramp waveform, it is necessary to convert the output from the subtractor 34 by the D-A converter 35 into an analog signal and control the gain of the variable gain amplifier 29 by the analog signal or to use a multiplying type D-A converter as the converter 28 and apply thereto an analog signal from the D-A converter 35. Thus, the prior art calls for two D-A converters and, in addition, involves the use of a variable gain amplifier and a multiplying type D-A converter as the converter 28. Hence the conventional optical interference gyro is expensive.

SUMMARY OF THE INVENTION

It is therefore an object of the present invention to provide a digital ramp phase type optical interference gyro which is smaller in the number of D-A converters used than in the past and hence is less expensive.

According to the present invention, the accumulated value and a threshold value are compared by comparator means and when the accumulated value exceeds the threshold value, the comparator means outputs the threshold value, but while the accumulated value remains smaller than the threshold value, the output from the comparator means remains zero. A synchronously detected output when the accumulated value exceeds the threshold value is detected as an error signal, from which a correcting signal derived. The correcting signal and a reference value are added by threshold output means to obtain the above-mentioned threshold value. The difference between the output from the comparator and the accumulated value is detected by a difference circuit and provided to a D-A converter, from which a converted analog signal is provided as a feedback modulation signal.

DESCRIPTION OF THE PREFERRED EMBODIMENT

Figure 1:
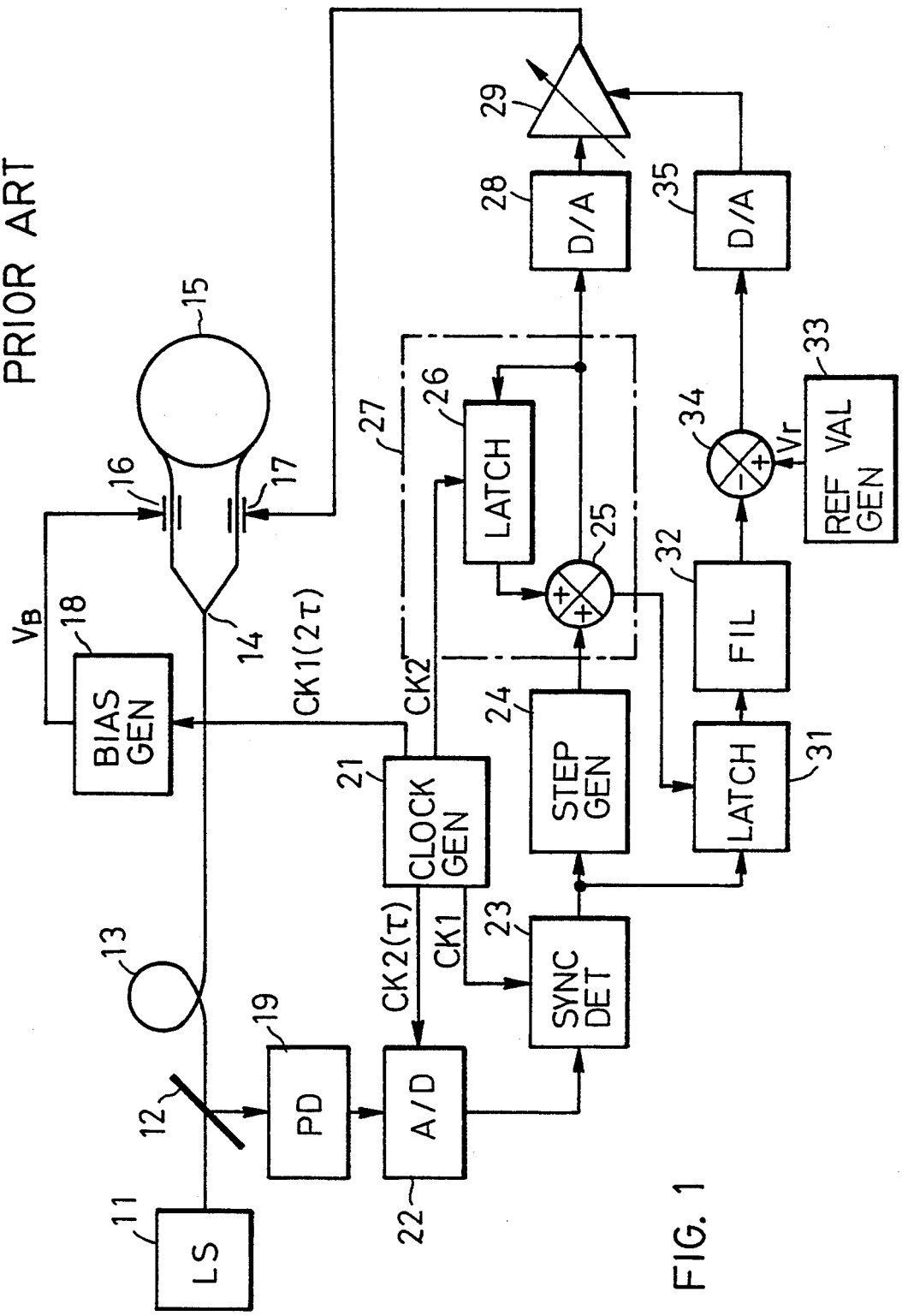
FIG. 1 is a block diagram showing a conventional optical interference gyro.
Figure 3:
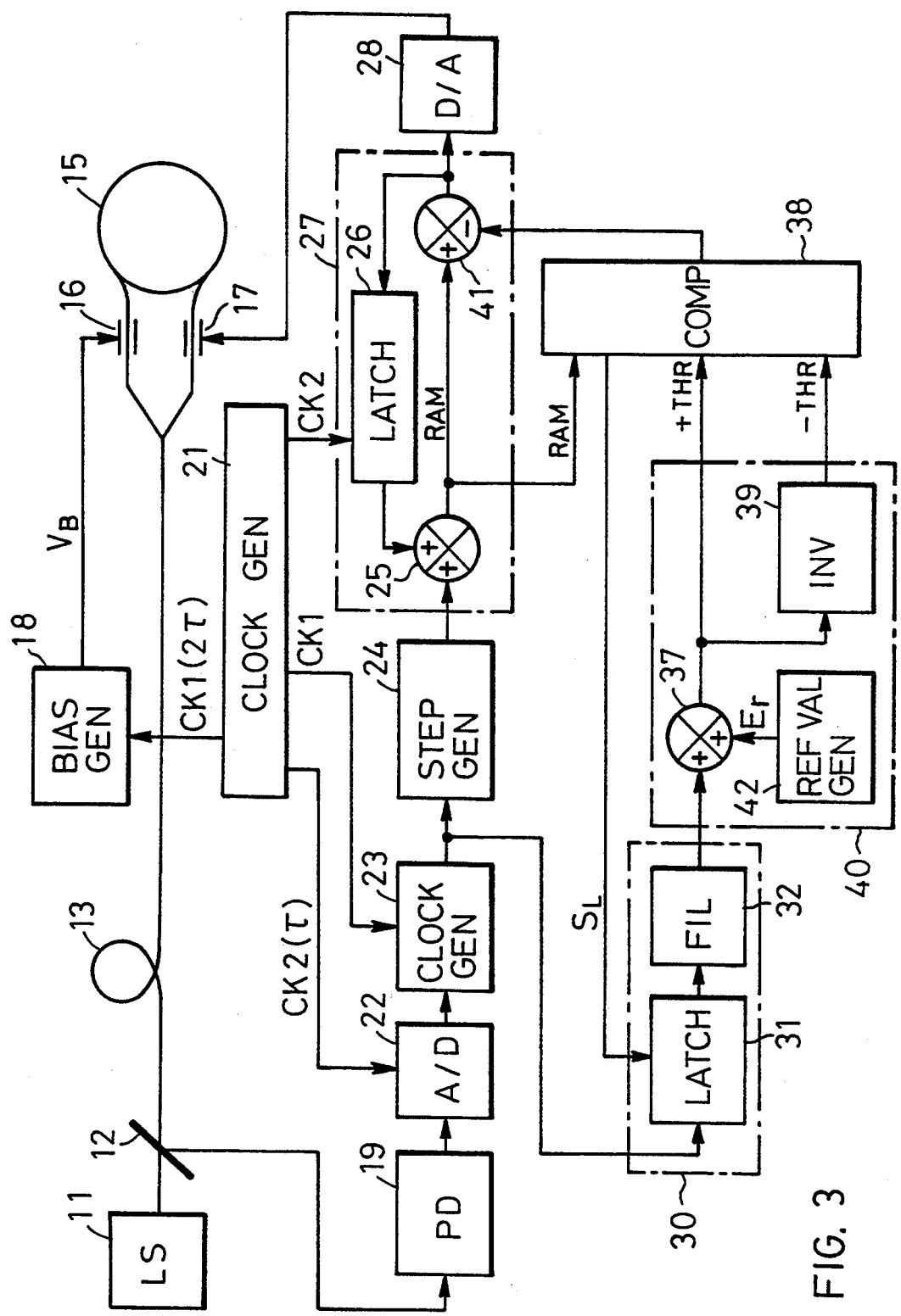
FIG. 3 is a block diagram illustrating an embodiment of the present invention.

FIG. 3 illustrates, in block form, an embodiment of the present invention, in which the parts corresponding to those in FIG. 1 are identified by the same reference numerals and no description will be given of them for the sake of brevity. In the present invention, an accumulated value (i.e. a ramp signal) RAM from the adder 25 is compared by a comparing part 38 with threshold values $\pm$THR from a threshold value generating part 40. When the accumulated value RAM increases in the positive direction and exceeds the threshold value +THR, the comparing part 38 outputs the threshold value +THR; conversely, when the accumulated value RAM increased in the negative direction and exceeds the threshold value $-$THR, the comparing part 38 outputs the threshold value $-$THR. When +THR>RAM>$-$THR, the output from the comparing part 38 is zero.

Figure 4:
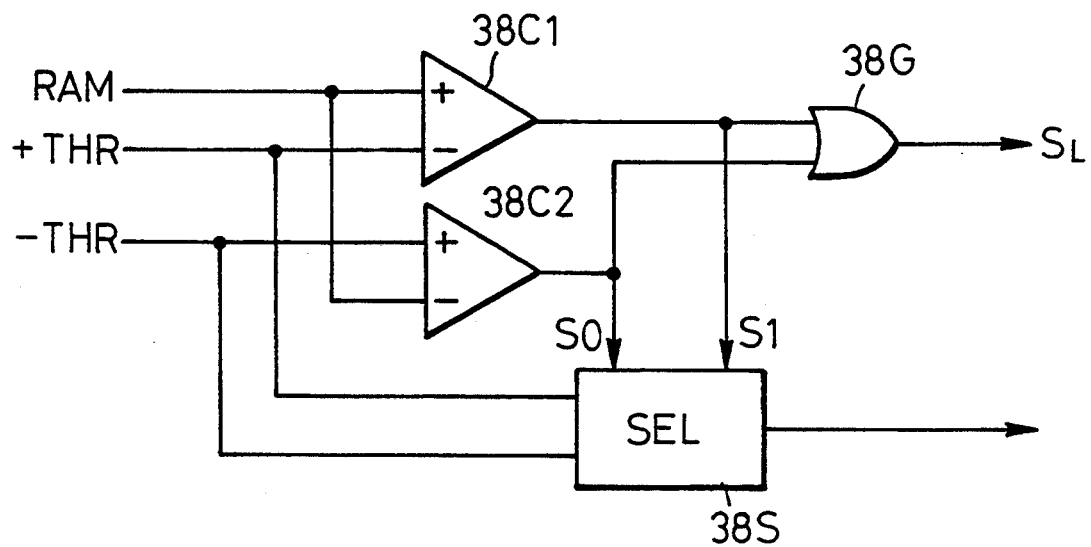
FIG. 4 is a block diagram showing an example of the construction of a comparing part 38 in FIG. 3.

The comparing part 38 is composed of, for example, two comparators 38C1 and 38C2, a selector 38S and an OR gate 38G as shown in FIG. 4. The comparators 38C1 and 38C2 are digital magnitude comparators, each of which yields an H-logic or L-logic output, depending on whether the value provided to its non-inverting input terminal is larger or smaller than the value provided to its inverting input terminal. The accumulated value RAM is provided to the non-inverting input terminal of the one comparator 38C1 and the inverting input terminal of the other comparator 38C2, and the threshold values +THR and $-$THR are provided to the inverting input terminal of the comparator 38C1 and the non-inverting input terminal of the comparator 38C2, respectively. The outputs from the comparators 38C1 and 38C2 are provided as select control signals $S_1$ and $S_O$ to the selector 38S, while at the same time they are applied to the OR gate 38G, whose output is provided as a latch signal $S_L$ to the latch circuit 31. The selector 38S selects and outputs the value +THR when the control signals $S_1$ and $S_O$ are H-logic and L-logic, respectively, and $-$THR when the control signals $S_1$ and $S_O$ are L-logic and H-logic, respectively. When the signals $S_1$ and $S_O$ are both L-logic, the selector 38C outputs a "0". Such a selector is commercially available.

The accumulating part 27 has a construction in which a subtractor 41 is connected to the output side of the adder 25 in the accumulating part 27 shown in FIG. 1. The output from the comparing part 38 is subtracted by the subtractor 41 from the accumulated value RAM provided from the adder 25, the subtracted output is fed to the latch circuit 26 and while at the same time it is applied to the D-A converter 28 to obtain therefrom the aforementioned analog feedback modulation signal. In the comparing part 38, when the accumulated value RAM exceeds the threshold value +THR or $-$THR in the positive or negative direction, the latch signal $S_L$ is generated and the output from the synchronous detector 23 at that time is latched as an error in the latch circuit 31, the output of which is integrated by the integrating filter 32. The latch circuit 31 and the integrating filter 32 constitute a correcting signal generating part 30, from which the integrated output of the integrating filter 32 is provided as a correcting signal. The correcting signal is added by an adder 37 to a reference value Er from a reference value generator 42 and the added output is provided as a corrected threshold value +THR, while at the same time it is inverted by an inverter 39, from which it is output as a corrected threshold value −THR.

In the initial state, the output from the integrating filter 32 is zero and the reference value Er from the reference value generator 42 is output from the adder 37; in this instance, the reference value Er and its inverted value −Er are output as threshold values ±THR. When the accumulated value RAM exceeds the threshold value +THR in the positive direction or −THR in the negative direction, +THR=Er or −THR=−Er is subtracted by the subtractor 41 from the accumulated value RAM and a flyback of the accumulation takes place. The reference value Er is initialized such that the phase difference between the CW and CCW light beams emitted from the looped optical path 15 is an integral multiple of $2\pi$ rad when such a flyback occurs. That is, in the present invention the adder 25 has such a number of bits as not to overflow even if a maximum step value corresponding to a maximum value of the angular rate to be measured is added to the accumulated value RAM corresponding to $2n\pi$ rad (which number of bits is one that the maximum value represented by it is larger than the sum of the above-said maximum step value and the reference value Er) and the flyback of the accumulated value RAM is effected by the subtraction of the threshold value in the subtractor 41.

Figure 2:
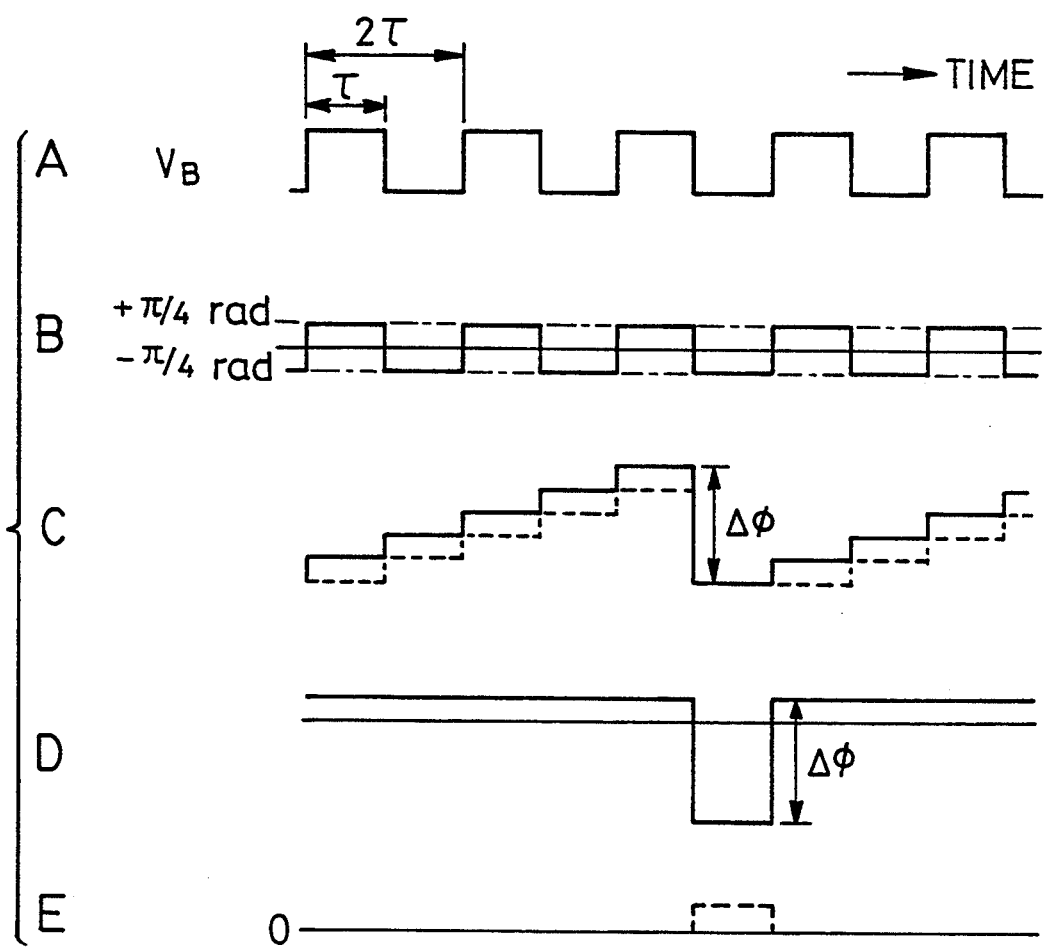
FIG. 2 is a timing chart for explaining its operation.
Figure 5A:
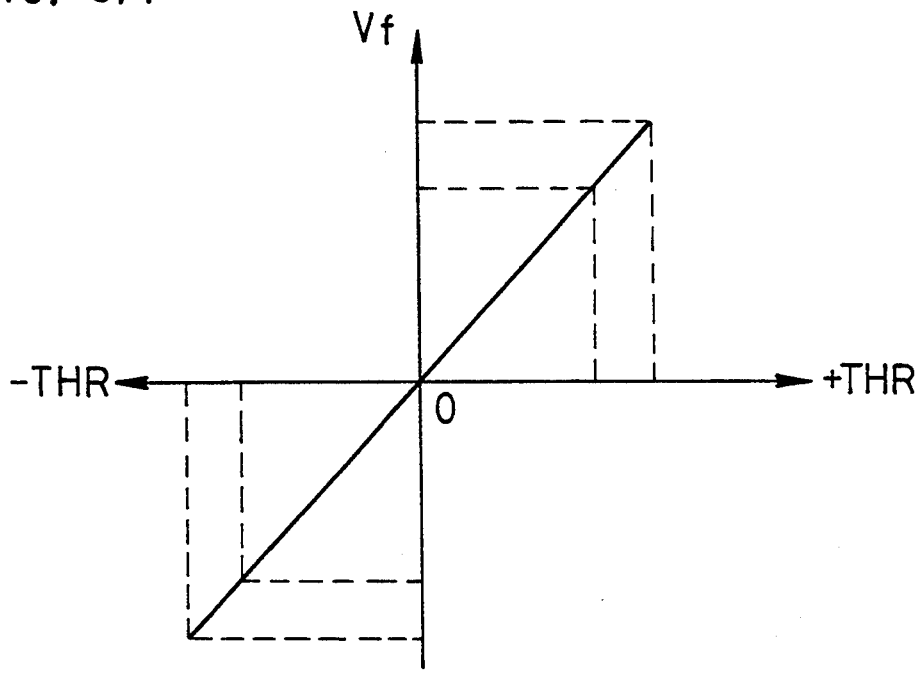
FIG. 5A is a graph showing the relationship between a digital flyback value and an analog flyback value in the present invention.
Figure 5B:
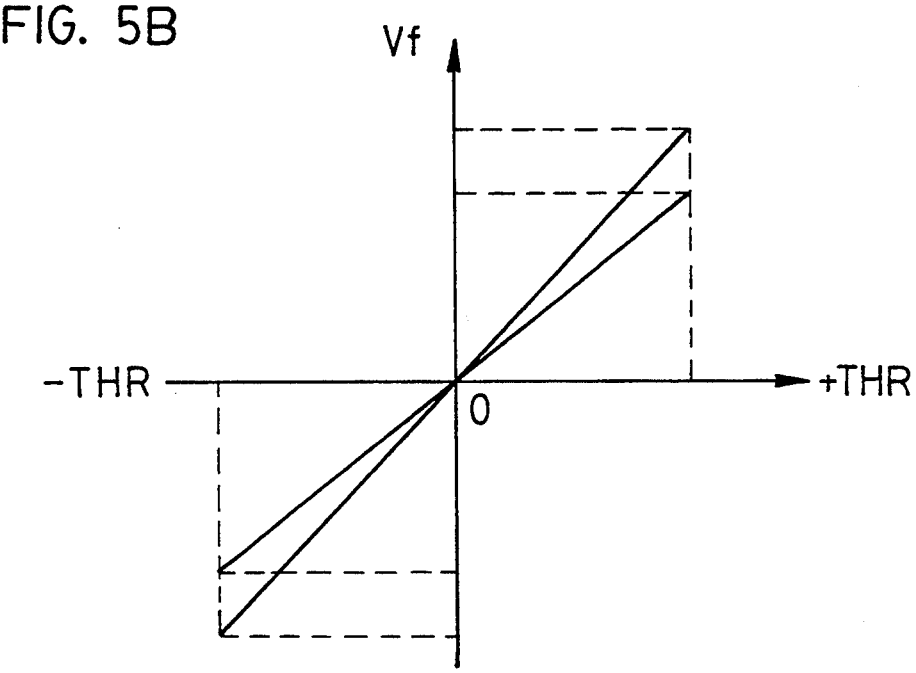
FIG. 5B is a graph similarly showing the relationship between digital and analog flyback values in the prior art.

When the voltage gain of the phase modulator 17 changes owing to a temperature change or the like, a flyback voltage changes which is necessary for causing a phase shift of $2n\pi$ rad ($\Delta\phi$ in FIG. 2) and is applied to the phase modulator 17, and consequently, the digital value of the accumulated value RAM corresponding to $2n\pi$ rad also changes. Hence, a deviation is induced between the absolute value of the threshold value THR and the digital value corresponding to $2n\pi$ rad and the output from the synchronous detector 23 is latched as an error in the latch circuit 31 by the latch signal $S_L$ generated at the time of flyback, then the threshold value THR increases or decreases, making the phase difference between the CW and CCW light beams to be an integral multiple of $2\pi$ rad. That is, in the present invention, as shown in FIG. 5A, the flyback value at the time of flyback, that is, the digital value of the threshold value THR or −THR, which is fed to the D-A converter 28, changes and the flyback value Vf of the analog voltage, which is applied to the phase modulator 17, is corrected accordingly, whereby the phase difference between the CW and CCW light beams is held an integral multiple of $2\pi$ rad. In contrast to the above, in the prior art example of FIG. 1 the phase difference between the CW and CCW light beams is maintained to be an integral multiple of $2\pi$ rad by changing its weight per bit, that is, by changing the slope of the conversion characteristic of the converter 28 as shown in FIG. 5B.

As described above, the gyro of the present invention uses only one D-A converter and permits the omission of the expensive D-A converter 35, and hence is low-cost accordingly.

What is claimed is:

1. A digital ramp phase type optical interference gyro wherein:

light from a light source is split by optical coupler means and provided therefrom as clockwise and counterclockwise like beams to a looped optical path;

said clockwise and counterclockwise light beams are phase modulated, by phase modulator means inserted between one end of said looped optical path and said optical coupler means, with a 50%-duty square wave which has a period twice longer than the time, $\tau$, for the propagation of light through said looped optical path;

said clockwise and counterclockwise light beams having propagated through said looped optical path are combined by said optical coupler means into interference light and the intensity of said interference light is converted by a photodetector into an electric signal;

said electric signal is converted by an A-D converter into a digital signal, said digital signal is synchronously detected digitalwise and step values corresponding to the detected output are sequentially generated by a step value generator;

an accumulated value, which varies rampwise, is generated by repeatedly accumulating said step values with accumulator means until its output exceeds a predetermined value, and said accumulated value is converted by a D-A converter into an analog value; and said clockwise and counterclockwise light beams are phase modulated with said analog value by said phase modulator means;

the improvement comprising:

comparator means for comparing said accumulated value and a threshold value and for outputting a detection signal and said threshold value when detecting that said accumulated value has exceeded said threshold value;

correcting signal generator means which responds to said detection signal from said comparator means to latch, as an error, said synchronously detected output when said accumulated value exceeded said threshold value and generates a correcting signal; and threshold generator means which generates a corrected version of said threshold value by adding said correcting signal and a reference value and provides said corrected threshold value to said comparator means;

wherein said accumulator means includes means for controlling a limit value of said accumulated value in accordance with said corrected threshold value from said comparator means.

2. The optical interference gyro of claim 1, wherein said threshold value generator means includes means for generating another corrected threshold value opposite in polarity but equal in absolute value to said corrected threshold value, and said comparator means is adapted so that when said accumulated value exceeds said another corrected threshold value in the direction of its polarity, it generates said detected signal and provides said another corrected threshold value to said accumulator means to control said limit value of said accumulated value and a limit value of a polarity inverted version of said accumulated value.

3. The optical interference gyro of claim 2, wherein said comparator means includes: first and second comparators which are supplied with said corrected threshold value and said another corrected threshold value, respectively, compare said accumulated values with said corrected threshold value and said another corrected threshold value, respectively, output zeros when said accumulated value does not exceed said corrected threshold value and said another corrected threshold value in the directions of their polarity and each output said detection signal when said accumulated value exceeds said corrected threshold value and said another corrected threshold value in the directions of their polarity; and selector means which responds to said detection signals from said first and second comparators to select either one of said corrected threshold value and said another corrected threshold value provided to said first and second comparators and apply said selected threshold value to said means for correcting the limit value of said accumulated value.

4. The optical interference gyro of claim 1, 2, or 3, wherein said accumulator means includes: adder means which adds said step values to said accumulated value of the previous cycle and outputs the added value as an accumulated value; latch means which holds said accumulated value from said adder means and provides it to said adder means for addition to the next step value; and subtractor means whereby, when said accumulated value exceeds said threshold value, said corrected threshold value provided from said comparator means is subtracted from said accumulated value to thereby cause a flyback of the said accumulated value, the number of bits of said adder means being chosen such that a maximum value represented by said number of bits is larger than the sum of a step value corresponding to a maximum value of an angular rate to be measured and said reference value.

* * * * *